United States Patent
Roeben et al.

(10) Patent No.: US 11,059,961 B2
(45) Date of Patent: Jul. 13, 2021

(54) RUBBER MIXTURES

(71) Applicant: Evonik Operations GmbH, Essen (DE)

(72) Inventors: Caren Roeben, Essen (DE); Sascha Erhardt, Rheinfelden (DE); Frank Forster, Schoellkrippen (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 15/781,223

(22) PCT Filed: Nov. 28, 2016

(86) PCT No.: PCT/EP2016/078980
§ 371 (c)(1),
(2) Date: Jun. 4, 2018

(87) PCT Pub. No.: WO2017/097619
PCT Pub. Date: Jun. 15, 2017

(65) Prior Publication Data
US 2018/0355156 A1    Dec. 13, 2018

(30) Foreign Application Priority Data

Dec. 7, 2015    (DE) ............ 10 2015 224 450.4

(51) Int. Cl.
| | |
|---|---|
| *C08L 21/00* | (2006.01) |
| *C08K 5/17* | (2006.01) |
| *C08K 5/5419* | (2006.01) |
| *C08K 5/548* | (2006.01) |
| *C08K 5/5425* | (2006.01) |
| *C08L 25/10* | (2006.01) |
| *C08L 47/00* | (2006.01) |

(52) U.S. Cl.
CPC ............ *C08L 21/00* (2013.01); *C08K 5/17* (2013.01); *C08K 5/548* (2013.01); *C08K 5/5419* (2013.01); *C08K 5/5425* (2013.01); *C08L 25/10* (2013.01); *C08L 47/00* (2013.01)

(58) Field of Classification Search
CPC .......... C08L 21/00; C08L 25/10; C08L 47/00; C08K 5/548; C08K 5/5425; C08K 5/5419; C08K 5/17

USPC ........................................................ 523/149
See application file for complete search history.

(56) References Cited

U.S. PATENT DOCUMENTS

| | | | | |
|---|---|---|---|---|
| 6,384,118 B1 * | 5/2002 | Hergenrother | ........ | B60C 1/0016 524/265 |
| 2003/0229166 A1 * | 12/2003 | Krafczyk | .............. | B60C 1/0016 524/261 |
| 2010/0132868 A1 * | 6/2010 | Hergenrother | ....... | C08K 5/5419 152/564 |
| 2011/0237729 A1 * | 9/2011 | Chen | ...................... | C08K 5/151 524/388 |
| 2013/0338256 A1 * | 12/2013 | Steiner | .................. | B60C 1/0016 523/156 |

FOREIGN PATENT DOCUMENTS

| | | |
|---|---|---|
| CN | 103601925 A | 2/2014 |
| GB | 953350 A | 3/1964 |
| JP | 9-324287 A | 12/1997 |
| WO | WO-2016048935 A1 * | 3/2016 ............. C08K 5/548 |

OTHER PUBLICATIONS

English Machine Translation of JP 09-324287 (Year: 1997).*
U.S. Appl. No. 15/781,257, filed Jun. 4, 2018, Roeben, C., et al.
International Search Report and Written Opinion dated Feb. 13, 2017 in PCT/EP2016/078980. 13 pages.

* cited by examiner

*Primary Examiner* — Angela C Scott
(74) *Attorney, Agent, or Firm* — Oblon, McClelland, Maier & Neustadt, L.L.P.

(57) ABSTRACT

The invention relates to rubber mixtures, said rubber mixtures comprising (a) at least one rubber, excluding silicone rubber, chloroprene rubber, bromobutyl rubber, fluoro rubber and nitrile rubber,
(b) at least one silane of general formula (I), $$G-Si(-OR)_3 \qquad (I),$$

(c) at least one amine compound selected from the list triethanolamine, triisopropanolamine and [HO—CH(phenyl)CH$_2$]$_3$N and
(d) at least one bifunctional silane.
The rubber mixture is produced by mixing the rubber, silane of general formula (I), amine compound and bifunctional silane.

10 Claims, No Drawings

RUBBER MIXTURES

The present invention relates to rubber mixtures, to a process for the production thereof and to the use thereof.

EP 2810956, EP 1866366 and GB 953350 disclose silicone rubber/nitrile rubber mixtures comprising triethanolamine.

Resin mixtures/plastics mixtures comprising triethanolamine are also disclosed in CN 103937347, CN 103694545 and CN 104312380.

CN 103601925 and CN 103554891 disclose mixtures comprising a special rubber, triethanolamine and optionally methyltriethoxysilane.

A disadvantage of the known rubber mixtures comprising methyltriethoxysilane and triethanolamine is the lower crosslinking density.

The use of diphenylguanidine as an accelerator in rubber mixtures is disclosed in various places in the literature (H.-D. Luginsland, A Review on the chemistry and reinforcement of the silica-silane filler system for rubber applications, Shaker, Aachen, 2002, p. 49).

A further disadvantage of rubber mixtures comprising diphenylguanidine is the release of amines which are categorized as toxic.

The invention has for its object to provide rubber mixtures which release no toxic amines and achieve a high crosslinking density.

The invention provides rubber mixtures which are characterized in that they comprise
(a) at least one rubber, excluding silicone rubber, chloroprene rubber, bromobutyl rubber, fluoro rubber and nitrile rubber,
(b) at least one silane of general formula (I),

$$\text{G-Si}(-\text{OR})_3 \qquad (I),$$

wherein G is a monovalent, unbranched or branched, saturated or unsaturated, aliphatic, aromatic or mixed aliphatic/aromatic $(C_2-C_{16})-$, preferably $(C_3-C_{12})-$, particularly preferably $(C_3-C_8)-$, very particularly preferably $(C_3)-$, hydrocarbon chain,
R is identical or different and is a straight-chain unsubstituted or branched unsubstituted $(C_1-C_{10})$-alkyl, preferably $(C_1-C_6)$-alkyl, particularly preferably methyl or ethyl, group or an alkylpolyether group $-(R^1-O)_m-R^2$, where $R^1$ is identical or different and is a branched or unbranched, saturated or unsaturated, aliphatic divalent $C_1-C_{30}$ hydrocarbon group, m is on average 1 to 30 and $R^2$ is an unsubstituted or substituted, branched or unbranched, monovalent $C_1-C_{30}$-alkyl, $C_2-C_{30}$-alkenyl, $C_6-C_{30}$-aryl or $C_7-C_{30}$-aralkyl group,
(c) at least one amine compound selected from the group triethanolamine, triisopropanolamine and [HO—CH(phenyl)CH$_2$]$_3$N and
(d) at least one bifunctional silane.

The rubber (a) may preferably be a diene rubber, preferably natural rubber, polyisoprene, polybutadiene, styrene-butadiene copolymers, isobutylene/isoprene copolymers, butadiene/acrylonitrile copolymers, ethylene/propylene/diene copolymers (EPDM), partly hydrogenated or fully hydrogenated NBR rubber.

Silane (b) of general formula (I) may preferably be CH$_3$(CH$_2$)$_{14}$CH$_2$—Si(—O—CH$_2$—CH$_3$)$_3$, CH$_3$(CH$_2$)$_6$CH$_2$—Si(—O—CH$_2$—CH$_3$)$_3$, CH$_3$CH$_2$CH$_2$—Si(—O—CH$_2$—CH$_3$)$_3$, CH$_3$(CH$_2$)$_{14}$CH$_2$—Si(—O—CH$_3$)$_3$, CH$_3$(CH$_2$)$_6$CH$_2$—Si(—O—CH$_3$)$_3$, CH$_3$CH$_2$CH$_2$—Si(—O—CH$_3$)$_3$, phenyl-Si(—O—CH$_2$—CH$_3$)$_3$, phenyl-Si(—O—CH$_3$)$_3$, CH$_2$=CH—CH$_2$—Si(—O—CH$_2$—CH$_3$)$_3$ or CH$_2$=CH—CH$_2$—Si(—O—CH$_3$)$_3$.

Silanes of general formula (I) may be mixtures of silanes of general formula (I).

Silanes of general formula (I) may be partly hydrolysed compounds of silanes of general formula (I).

The bifunctional silane (d) may be a sulphur silane, vinyltriethoxysilane, vinyltrimethoxysilane, 3-glycidyloxypropyltriethoxysilane, 3-glycidyloxypropyltrimethoxysilane, 3-methacryloxypropyltriethoxysilane or methacryloxypropyltrimethoxysilane.

The sulphur silane may be a sulphur silane of formula (II)

$$[(RO)_3Si-R^3-]_nA \qquad (II)$$

where R is as described in formula (I), $R^3$ is a branched or unbranched, saturated or unsaturated, aliphatic, aromatic or mixed aliphatic/aromatic divalent $C_1-C_{30}$ hydrocarbon group; when n=2 A is $S_x$ where x=1-10 and when n=1 A is SH or SCN.

The sulphur silane (d) may preferably be bis[3-triethoxysilyl)propyl]tetrasulphide, bis[3-triethoxysilyl)propyl]disulphide, 3-mercaptopropyltriethoxysilane, (EtO)$_3$Si—(CH$_2$)$_3$—S—C(O)—C$_7$H$_{15}$, (EtO)$_3$Si—(CH$_2$)$_3$—SCN, (C$_{13}$H$_{27}$(OCH$_2$CH$_2$)$_5$—O—)$_2$(CH$_3$O)Si—(CH$_2$)$_3$—SH or (C$_{13}$H$_{27}$(OCH$_2$CH$_2$)$_5$—O—)$_2$(C$_2$H$_5$O)Si—(CH$_2$)$_3$—SH.

The silane (b) of general formula (I) may be present in amounts of 0.1 to 8 parts by wt, preferably 0.2 to 6 parts by wt, particularly preferably 0.8 to 4 parts by wt, based on 100 parts by wt of the employed rubber.

The amine compound (c) may be present in amounts of 0.1 to 8 parts by wt, preferably 0.2 to 5 parts by wt, particularly preferably 0.7 to 4 parts by wt, based on 100 parts by wt of the employed rubber.

The bifunctional silane (d) may be present in amounts of 2 to 15 parts by wt, preferably 4 to 12 parts by wt, particularly preferably 5 to 9 parts by wt, based on 100 parts by wt of the employed rubber.

The rubber mixture according to the invention may preferably comprise
(a) a diene rubber as the rubber,
(b) CH$_3$CH$_2$CH$_2$—Si(—O—CH$_2$—CH$_3$)$_3$ as the silane of general formula (I),
(c) triethanolamine as the amine compound and
(d) bis[3-triethoxysilyl)propyl]tetrasulphide, bis[3-triethoxysilyl)propyl]disulphide, 3-mercaptopropyltriethoxysilane, (EtO)$_3$Si—(CH$_2$)$_3$—S—C(O)—C$_7$H$_{15}$, (EtO)$_3$Si—(CH$_2$)$_3$—SCN, (C$_{13}$H$_{27}$(OCH$_2$CH$_2$)$_5$—O—)$_2$(CH$_3$O)Si—(CH$_2$)$_3$—SH or (C$_{13}$H$_{27}$(OCH$_2$CH$_2$)$_5$—O—)$_2$(C$_2$H$_5$O)Si—(CH$_2$)$_3$—SH as the bifunctional silane.

The present invention further provides a process for the production of the rubber mixtures according to the invention which is characterized in that it comprises mixing
(a) at least one rubber, excluding silicone rubber, chloroprene rubber, fluoro rubber and nitrile rubber,
(b) at least one silane of general formula (I),

$$\text{G-Si}(-\text{OR})_3 \qquad (I),$$

wherein G and R are as defined above,
(c) at least one amine compound selected from the group triethanolamine, triisopropanolamine and [HO—CH(phenyl)CH$_2$]$_3$N and
(d) at least one bifunctional silane.

The rubber mixture may comprise at least one filler.

The addition of the silanes of general formula (I) and the addition of the fillers may be effected at material temperatures of 100° C. to 200° C. However said addition may also be effected at lower temperatures of 40° C. to 100° C., for example together with further rubber auxiliaries.

The silane of general formula (I) may be added to the mixing operation alone or optionally with the amine compound either in pure form or else applied to an inert organic or inorganic carrier or prereacted with an organic or inorganic carrier. Preferred carrier materials may be precipitated or pyrogenic silicas, waxes, thermoplastics, natural or synthetic silicates, natural or synthetic oxides, preferably aluminium oxide, or carbon blacks.

Fillers employable for the inventive rubber mixtures include the following fillers:

carbon blacks: The carbon blacks to be used here may be produced by the lamp black process, furnace black process, gas black process or thermal black process. The carbon blacks may have a BET surface area of 20 to 200 $m^2/g$. The carbon blacks may optionally also be doped, for example with Si.

Amorphous silicas, preferably precipitated silicas or pyrogenic silicas. The amorphous silicas may have a specific surface area of 5 to 1000 $m^2/g$, preferably 20 to 400 $m^2/g$ (BET surface area) and a primary particle size of 10 to 400 nm. The silicas may optionally also be in the form of mixed oxides with other metal oxides, such as oxides of Al, Mg, Ca, Ba, Zn and titanium.

Synthetic silicates, such as aluminium silicate or alkaline earth metal silicates, for example magnesium silicate or calcium silicate. The synthetic silicates having BET surface areas of 20 to 400 $m^2/g$ and primary particle diameters of 10 to 400 nm.

Synthetic or natural aluminium oxides and hydroxides.

Natural silicates, such as kaolin and other naturally occurring silicas.

Glass fibres and glass-fibre products (mats, strands) or glass microbeads.

It is preferably possible to employ amorphous silicas, particularly preferably precipitated silicas or silicates, especially preferably precipitated silicas having a BET surface areas of 20 to 400 $m^2/g$ in amounts of 5 to 180 parts by wt in each case based on 100 parts of rubber.

The cited fillers may be used alone or in admixture. In a particularly preferred embodiment of the process 10 to 180 parts by wt of fillers, preferably precipitated silica, optionally together with 0 to 100 parts by wt of carbon black, and 0.1 to 5 parts by wt of silane (b) of general formula (I), 0.1 to 5 parts by wt of amine compound (c) and 2 to 15 parts by wt of bifunctional silane (d) in each case based on 100 parts by weight of rubber may be employed to produce the mixtures.

Synthetic rubbers as well as natural rubber are suitable for producing the rubber mixtures according to the invention. Preferred synthetic rubbers are described, for example, in W. Hofmann, Kautschuktechnologie [Rubber Technology], Genter Verlag, Stuttgart 1980. They include, among others, polybutadiene (BR),
polyisoprene (IR),
styrene/butadiene copolymers, for example emulsion SBR (E-SBR) or solution SBR (S-SBR), preferably having a styrene content of 1 to 60 wt %, particularly preferably 2 to 50 wt %, based on the overall polymer,
isobutylene/isoprene copolymers (IIR),
butadiene/acrylonitrile copolymes, preferably having an acrylonitrile content of 5 to 60 wt %, preferably 10 to 50 wt %, based on the overall polymer (NBR),
partly hydrogenated or fully hydrogenated NBR rubber (HNBR),
ethylene/propylene/diene copolymers (EPDM) or
abovementioned rubbers additionally comprising functional groups, for example carboxyl, silanol or epoxy groups, for example epoxidized NR, carboxyl-functionalized NBR or silanol(-SiOH)-/siloxy(-Si—OR)-functionalized, amino-, epoxy-, mercapto-, hydroxyl-functionalized SBR, and mixtures of these rubbers. Of interest for the production of automobile tyre treads are in particular anionically polymerized S-SBR rubbers (solution SBR), preferably having a glass transition temperature above −50° C., and mixtures thereof with diene rubbers.

The rubber vulcanizates according to the invention may comprise further rubber auxiliaries, such as reaction accelerators, antioxidants, heat stabilizers, light stabilizers, antiozonants, processing aids, plasticizers, resins, tackifiers, blowing agents, dyes, pigments, waxes, extenders, organic acids, retarders, metal oxides and also activators, such as diphenylguanidine, polyethylene glycol, alkoxy-terminated polyethylene glycol alkyl-O—$(CH_2$—$CH_2$—$O)_{y'}$—H where $y'=2$-25, preferably $y'=2$-15, particularly preferably $y'=3$-10, very particularly preferably $y'=3$-6, or hexanetriol, that are familiar to the rubber industry.

The rubber auxiliaries may be used in known amounts, these amounts being determined by factors including the intended use. Customary amounts may for example be amounts of 0.1 to 50 wt % based on rubber. Crosslinkers that may be employed are peroxides, sulphur or sulphur-donor substances. The inventive rubber mixtures may additionally comprise vulcanization accelerators. Examples of suitable vulcanization accelerators may include mercaptobenzothiazoles, sulphenamides, guanidines, thiurams, dithiocarbamates, thioureas and thiocarbonates. The vulcanization accelerators and sulphur may be employed in amounts of 0.1 to 10 wt %, preferably 0.1 to 5 wt %, based on 100 parts by wt of rubber.

The vulcanization of the inventive rubber mixtures can be effected at temperatures of 100 to 200° C., preferably 120 to 180° C., optionally under a pressure of 10 to 200 bar. The blending of the rubbers with the filler, any rubber auxiliaries and the silanes may be carried out in customary mixing units, such as rollers, internal mixers and mixing extruders.

The rubber mixtures according to the invention may be used for producing moulded articles, for example for producing pneumatic tyres, tyre treads, cable sheathings, hoses, drive belts, conveyor belts, roller coverings, tyres, shoe soles, sealing rings and damping elements.

The rubber mixtures according to the invention must not comprise guanidines, preferably diphenylguanidine.

The silanes of general formula (I) may be employed together with the amine compounds as secondary accelerators. This makes it possible to partly or completely eschew the use of guanidine accelerators.

The rubber mixtures according to the invention have the advantage that compared to the known guanidine accelerators said mixtures do not release any toxic aniline/aniline derivatives during vulcanization and in rubber mixtures without DPG exhibit a steeper vulcanization curve, improved processability (Mooney viscosity), longer incubation times (t10, t20), faster vulcanization times (t90).

EXAMPLES

Example 1: Rubber Tests

The formulation used for the rubber mixtures is specified in tables 1a and 1b which follow. The unit phr means parts by weight based on 100 parts of the raw rubber used. The silanes of general formula I are employed in equimolar amounts, i.e. the amount of substance is equal.

TABLE 1a

| stage 1 | comparative mixture 1 (phr) | comparative mixture 2 (phr) | comparative mixture 3 (phr) | inventive mixture 4 (phr) | inventive mixture 5 (phr) | inventive mixture 6 (phr) | inventive mixture 7 (phr) |
|---|---|---|---|---|---|---|---|
| Buna VSL 4526-2[a] | 96.3 | 96.3 | 96.3 | 96.3 | 96.3 | 96.3 | 96.3 |
| Buna CB 24[b] | 30.0 | 30.0 | 30.0 | 30.0 | 30.0 | 30.0 | 30.0 |
| ULTRASIL ® 7000 GR[c] | 80.0 | 80.0 | 80.0 | 80.0 | 80.0 | 80.0 | 80.0 |
| Si 266 ®·[d] | 5.8 | 5.8 | 5.8 | 5.8 | 5.8 | 5.8 | 5.8 |
| Corax ® N 330[e] | 5.0 | 5.0 | 5.0 | 5.0 | 5.0 | 5.0 | 5.0 |
| ZnO[f] | 2.0 | 2.0 | 2.0 | 2.0 | 2.0 | 2.0 | 2.0 |
| fatty acid[g] | 2.0 | 2.0 | 2.0 | 2.0 | 2.0 | 2.0 | 2.0 |
| Vivatec 500[h] | 8.8 | 8.8 | 8.8 | 8.8 | 8.8 | 8.8 | 8.8 |
| Protektor G 3108[i] | 2.0 | 2.0 | 2.0 | 2.0 | 2.0 | 2.0 | 2.0 |
| Vulkanox ® 4020/LG[j] | 2.0 | 2.0 | 2.0 | 2.0 | 2.0 | 2.0 | 2.0 |
| Vulkanox ® HS/LG[k] | 1.5 | 1.5 | 1.5 | 1.5 | 1.5 | 1.5 | 1.5 |
| triethanolamine[l] | | | 1.4 | 1.4 | 1.4 | 1.4 | 1.4 |
| Rhenogran ® DPG-80[m] | 2.5 | | | | | | |
| organosilicon compound 1[n] | | | 1.6 | | | | |
| organosilicon compound 2[o] | | | | 1.9 | | | |
| organosilicon compound 3[p] | | | | | 1.5 | | |
| organosilicon compound 4[q] | | | | | | 1.9 | |
| organosilicon compound 5[r] | | | | | | | 2.2 |

TABLE 1b

| stage 2 stage 1 batch stage 3 stage 2 batch | | | | | | | |
|---|---|---|---|---|---|---|---|
| Perkacit TBzTD[s] | 0.2 | 0.2 | 0.2 | 0.2 | 0.2 | 0.2 | 0.2 |
| Vulkacit ® CZ/EG-C[t] | 1.6 | 1.6 | 1.6 | 1.6 | 1.6 | 1.6 | 1.6 |
| sulphur[u] | 2.0 | 2.0 | 2.0 | 2.0 | 2.0 | 2.0 | 2.0 |

Substances Used:
a) Buna VSL 4526-2: solution-polymerized SBR copolymer from Lanxess AG (styrene content=26 wt %, vinyl content=44.5 wt %, TDAE oil content=27.3 wt %, Mooney viscosity (ML 1+4/100° C.)=50 MU).
b) Buna CB 24: solution-polymerized high cis-1,4-polybutadiene (neodymium catalyst) from Lanxess AG (cis-1,4 content=min. 96%, Mooney viscosity (ML 1+4/100° C.) 44 MU).
c) Silica: ULTRASIL® 7000 GR from Evonik Industries AG (easily dispersible precipitated silica, BET surface area=170 m²/g, CTAB surface area=160 m²/g).
d) Si 266®: bis(triethoxysilylpropyl)disulphide from Evonik Industries AG.
e) Corax® N 330: ASTM carbon black from Orion Engineered Carbons GmbH.
f) ZnO: RS RAL 844 C ZnO zinc oxide from Arnsperger Chemikalien GmbH.
g) EDENOR ST1 fatty acid mixture ($C_{16}/C_{18}$) from Caldic Deutschland Chemie B.V.
h) Vivatec 500: TDAE oil from H&R AG.
i) Protektor G3108: antiozonant wax composed of refined hydrocarbons (freezing point=57° C.) from Paramelt B.V.
j) Vulkanox® 4020/LG: N-(1,3-dimethylbutyl)-N'-phenyl-p-phenylenediamine (6PPD) from Rhein Chemie Rheinau GmbH.
k) Vulkanox® HS/LG: polymeric 2,2,4-trimethyl-1,2-dihydroquinoline (TMQ) from Rhein Chemie Rheinau GmbH.
l) Triethanolamine from BASF SE.
m) Rhenogran® DPG-80: 80% N,N'-diphenylguanidine (DPG) on 20% elastomeric carrier and dispersant from Rhein Chemie Rheinau GmbH.
n) Organosilicon compound 1: Dynasylan® MTES (methyltriethoxysilane) from Evonik Industries AG.
o) Organosilicon compound 2: Dynasylan® PTEO (propyltriethoxysilane) from Evonik Industries AG.
p) Organosilicon compound 3: Dynasylan® PTMO (propyltrimethoxysilane) from Evonik Industries AG.
q) Organosilicon compound 4: allyltriethoxysilane from abcr GmbH.
r) Organosilicon compound 5: triethoxyphenylsilane from TCI Europe N.V.
s) Perkacit TBzTD: tetrabenzylthiuram disulphide (TBzTD) obtained from Weber & Schaer (producer: Dalian Richon).
t) Vulkacit® CZ/EG-C: N-cyclohexyl-2-benzothiazolesulphenamide from Rhein Chemie Rheinau GmbH.
u) Sulphur: Mahlschwefel 80/90 from Solvay & CPC Barium Strontium GmbH & Co. KG.

The mixtures are prepared in three stages in a 1.5 L internal mixer (E-type) at a batch temperature of 155° C. in accordance with the mixing instructions in table 2.

The general process for preparing rubber mixtures and vulcanizates thereof is described in the book: "Rubber Technology Handbook", W. Hofmann, Hanser Verlag 1994.

TABLE 2

| | stage 1 |
|---|---|
| settings | |
| mixing unit | HF mixing group GmbH; type GK 1.5 E |
| fill level | 0.65 |
| Speed | 80 rpm |

TABLE 2-continued

| | |
|---|---|
| ram pressure | 5.5 bar |
| Flow temp. | 80° C. |
| mixing operation | |
| 0 to 0.5 min | rubbers |
| 0.5 to 1.0 min | 6PPD, TMQ |
| 1.0 to 2.0 min | ½ of silica, Si 266, ZnO, fatty acid |
| 2.0 min | vent and purge |
| 2.0 to 3.0 min | ½ of silica, carbon black, TDAE oil, antiozonant wax, if present: DPG-80 or organosilicon compound 1-5 and triethanolamine |
| 3.0 min | vent |
| 3.0 to 5.0 min | mix at 155° C., optionally adjusting temperature by varying rotational speed |
| 5.0 min | discharge batch and form milled sheet on laboratory mixing roll mill for 45 s (laboratory roll mill: diameter 250 mm, length 190 mm, roll gap 4 mm, flow temperature 60° C.) 23 h storage at room temperature | stage 2

| | |
|---|---|
| settings | |
| mixing unit | as in stage 1 except |
| fill level | 0.62 |
| Speed | 95 rpm |
| Flow temp. | 90° C. |
| mixing operation | |
| 0 to 1.0 min | break up stage 1 batch |
| 1.0 to 3.0 min | mix at 155° C., optionally adjusting temperature by varying rotational speed |
| 3.0 min | discharge batch and form milled sheet on laboratory mixing roll mill for 45 s (laboratory roll mill: diameter 250 mm, length 190 mm, roll gap 4 mm, flow temperature 60° C.) 3 h storage at room temperature | stage 3

| | |
|---|---|
| settings | |
| mixing unit | as in stage 1 except |
| fill level | 0.59 |
| Speed | 55 rpm |
| Flow temp. | 50° C. |
| mixing operation | |
| 0 to 2.0 min | break up stage 2 batch, accelerant and sulphur, mix at 100° C., optionally adjusting temperature by varying speed |
| 2.0 min | discharge batch and form milled sheet on laboratory mixing roll mill for 20 s (laboratory roll mill: diameter 250 mm, length 190 mm, roll gap 4 mm, flow temperature 80° C.) |

Vulcanization is effected at a temperature of 165° C. in a typical vulcanizing press with a holding pressure of 120 bar after $t_{95\%}$. The $t_{95\%}$ time is determined by means of a moving die rheometer (rotorless vulcameter) as per ISO 6502 (section 3.2 "rotorless curemeter") at 165° C.

The rubber testing is effected in accordance with the test methods specified in table 3.

TABLE 3

| physical testing | standard/conditions |
|---|---|
| Mooney viscosity ML 1 + 4 at 100° C. Mooney viscosity/MU | ISO 289-1 |
| moving die rheometer (MDR) at 145° C., 1.67 Hz, 0.5° = 7% $t_{10}$/min $t_{20}$/min | ISO 6502, section 3.2 "rotorless curemeter" |
| rod tensile test at 23° C. reinforcement index modulus 300%/100% | ISO 37 |

Table 4 reports the rubber data for the crude mixtures and vulcanizates.

TABLE 4

|  | comparative mixture 1 | comparative mixture 2 | comparative mixture 3 | inventive mixture 4 | inventive mixture 5 | inventive mixture 6 | inventive mixture 7 |
|---|---|---|---|---|---|---|---|
| Raw mixture results: Mooney viscosity ML 1 + 4 at 100° C. Mooney viscosity/MU |  |  |  |  |  |  |  |
| stage 1 | 86 | 100 | 83 | 96 | 86 | 91 | 82 |
| stage 2 | 64 | 79 | 68 | 65 | 69 | 67 | 65 |
| stage 3 | 52 | 60 | 53 | 52 | 54 | 53 | 51 |
| moving die rheometer (MDR) at 165° C., 1.67 Hz, 0.5° = 7% |  |  |  |  |  |  |  |
| $\Delta$ torque ($M_{max} - M_{min}$)/dNm | 11.3 | 11.6 | 11.5 | 12.1 | 12.3 | 11.8 | 12.1 |
| $t_{10}$/min | 3.3 | 3.7 | 4.4 | 4.1 | 4.3 | 4.2 | 4.4 |
| $t_{20}$/min | 3.8 | 4.5 | 5.4 | 5.2 | 5.5 | 5.2 | 5.3 |
| $t_{90}$/min | 9.2 | 19.7 | 11.5 | 11.9 | 11.5 | 10.6 | 10.6 |
| vulcanizate results: |  |  |  |  |  |  |  |
| rod tensile test at 23° C. reinforcement index: 300%/100% stress value | 5.2 | 5.0 | 4.8 | 5.0 | 5.0 | 5.2 | 5.2 |

Compared to comparative mixture 2 the effect of the secondary accelerators is evidenced in all other mixtures by reduced vulcanization times (MDR, $t_{90\%}$ values) and improved processing (Mooney viscosities). Compared to the comparative mixtures 1 and 2 the combination of silane and triethanolamine in the inventive mixtures 4, 5, 6 and 7 and the comparative mixture 3 additionally achieves improved processing consistency (MDR, $t_{10\%}$ and $t_{20\%}$ values).

The inventive mixtures 4, 5, 6 and 7 further result in improved crosslinking density (MDR, $\Delta$ torque ($M_{max} - M_{min}$)) compared to comparative mixtures 1, 2 and 3. The inventive mixtures 4, 5, 6 and 7 moreover achieve the intended reinforcing effect of comparative mixtures 1 and 2 which is improved over that of comparative mixture 3.

The invention claimed is:

1. A rubber mixture, comprising:
    (a) a rubber, excluding silicone rubber, chloroprene rubber, bromobutyl rubber, fluoro rubber and nitrile rubber;
    (b) $CH_3CH_2CH_2—Si(—O—CH_2—CH_3)_3$ as a silane;
    (c) at least one amine compound selected from the group consisting of triethanolamine, triisopropanolamine and [HO—CH(phenyl)CH_2]_3N; and
    (d) a bifunctional silane,
    wherein the silane is present from 0.8 to 4 parts by wt based on 100 parts by wt of the rubber,
    the bifunctional silane is present in an amount of from 5 to 9 parts by wt based on 100 parts by wt of the rubber, and
    wherein the bifunctional silane is vinyltriethoxysilane, vinyltrimethoxysilane, 3-glycidyloxypropyltriethoxysilane, 3-glycidyloxypropyltrimethoxysilane, 3-methacryloxypropyltriethoxysilane, or methacryloxypropyltrimethoxysilane.

2. The rubber mixture according to claim 1, further comprising:
    a filler; and
    optionally additional rubber auxiliaries.

3. The rubber mixture according to claim 1, wherein the at least one amine compound is present in an amount of from 0.1 to 8 parts by wt based on 100 parts by wt of the rubber.

4. The rubber mixture according to claim 1, wherein the rubber is a diene rubber.

5. The rubber mixture according to claim 1, wherein the at least one amine compound is triethanolamine.

6. The rubber mixture according to claim 1, wherein the at least one amine compound is triisopropanolamine.

7. A process for producing the rubber mixture according to claim 1, the process comprising:
    mixing:
    (a) the rubber, excluding silicone rubber, chloroprene rubber, bromobutyl rubber, fluoro rubber and nitrile rubber,
    (b) the silane,
    (c) the at least one amine compound, and
    (d) the bifunctional silane.

8. A production method comprising:
    producing moulded articles using the rubber mixture according to claim 1.

9. The production method according to claim 8, wherein the moulded articles are selected from the group consisting of pneumatic tires, tire treads, rubber-containing tire components, cable sheathings, hoses, drive belts, conveyor belts, roller coverings, tires, shoe soles, sealing rings and damping elements.

10. A rubber mixture, comprising:
(a) a rubber, excluding silicone rubber, chloroprene rubber, bromobutyl rubber, fluoro rubber and nitrile rubber;
(b) $CH_3CH_2CH_2—Si(—O—CH_2—CH_3)_3$ as a silane;
(c) $[HO—CH(phenyl)CH_2]_3N$; and
(d) a bifunctional silane,
wherein the silane is present from 0.8 to 4 parts by wt based on 100 parts by wt of the rubber, and
the bifunctional silane is present in an amount of from 5 to 9 parts by wt based on 100 parts by wt of the rubber.

* * * * *